(12) United States Patent
Kim et al.

(10) Patent No.: US 11,656,687 B2
(45) Date of Patent: May 23, 2023

(54) METHOD FOR CONTROLLING INTERACTION INTERFACE AND DEVICE FOR SUPPORTING THE SAME

(71) Applicant: KOREA INSTITUTE OF SCIENCE AND TECHNOLOGY, Seoul (KR)

(72) Inventors: Min Gyeong Kim, Jeju-si (KR); Jung Min Park, Seoul (KR); Joong-Jae Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/868,506

(22) Filed: May 6, 2020

(65) Prior Publication Data

US 2021/0055802 A1  Feb. 25, 2021

(30) Foreign Application Priority Data

Aug. 19, 2019 (KR) .................. 10-2019-0100978

(51) Int. Cl.
　　*G06F 3/01*　　(2006.01)
　　*G06F 3/0484*　　(2022.01)
　　*G06F 3/04815*　　(2022.01)
　　*G06V 40/20*　　(2022.01)

(52) U.S. Cl.
　　CPC .............. *G06F 3/017* (2013.01); *G06F 3/011* (2013.01); *G06F 3/0484* (2013.01); *G06F 3/04815* (2013.01); *G06V 40/28* (2022.01)

(58) Field of Classification Search
　　CPC .......... G06F 3/011; G06F 3/012; G06F 3/014; G06F 3/017; G06F 3/04815; G06F 3/0484; G06K 9/00355
　　See application file for complete search history.

(56) References Cited

U.S. PATENT DOCUMENTS

| | | | |
|---|---|---|---|
| 9,690,376 B2 | 6/2017 | Davis et al. | |
| 10,007,352 B2* | 6/2018 | Poulos | G02B 27/0103 |
| 10,491,695 B2* | 11/2019 | Straub | G06F 11/1446 |
| 2010/0241842 A1* | 9/2010 | Acedo | G06F 9/44505 |
| | | | 713/100 |
| 2011/0096072 A1 | 4/2011 | Kim et al. | |

(Continued)

FOREIGN PATENT DOCUMENTS

| | | |
|---|---|---|
| JP | 2010113539 A | 5/2010 |
| KR | 1020110045589 A | 5/2011 |

(Continued)

OTHER PUBLICATIONS

"Blender". Blender Foundation [online],Retrieved from the Internet: <URL: www.blender.org/>.

(Continued)

*Primary Examiner* — Gene W Lee

(74) *Attorney, Agent, or Firm* — Rabin & Berdo, P.C.

(57) ABSTRACT

Provided is a method for controlling an interaction undo/redo interface. The method for controlling an interaction undo/redo interface includes causing interaction to be performed between a plurality of virtual objects created in a three-dimensional virtual space and a user, wherein the interaction is performed by recognition of the user's gesture, and activating the interaction undo interface or the interaction redo interface in response to a gesture not corresponding to the user's interaction gesture.

15 Claims, 18 Drawing Sheets

(56) References Cited

U.S. PATENT DOCUMENTS

| | | | |
|---|---|---|---|
| 2011/0199393 A1* | 8/2011 | Nurse | G06F 3/0482 345/665 |
| 2014/0028539 A1* | 1/2014 | Newham | G06F 1/1698 345/156 |
| 2014/0191998 A1* | 7/2014 | Chuang | G06F 3/017 345/173 |
| 2015/0177939 A1* | 6/2015 | Anderson | G06F 3/017 715/745 |
| 2015/0193138 A1* | 7/2015 | Relyea | G06F 3/04812 715/823 |
| 2017/0052595 A1* | 2/2017 | Poulos | G06F 3/013 |
| 2017/0124762 A1* | 5/2017 | Privault | G06F 40/106 |
| 2017/0249061 A1 | 8/2017 | Popescu et al. | |
| 2018/0095649 A1 | 4/2018 | Valdivia et al. | |
| 2019/0163260 A1 | 5/2019 | Park et al. | |
| 2019/0384405 A1* | 12/2019 | Iyer | G06F 1/1686 |
| 2020/0134895 A1* | 4/2020 | Pollard | G06F 3/016 |
| 2021/0141515 A1* | 5/2021 | Wichary | G06F 3/0481 |

FOREIGN PATENT DOCUMENTS

| | | |
|---|---|---|
| KR | 101121746 B1 | 3/2012 |
| KR | 1020140064693 A | 5/2014 |
| KR | 1020160132683 A | 11/2016 |
| KR | 10-1752223 B1 | 7/2017 |
| KR | 1020190062835 A | 6/2019 |

OTHER PUBLICATIONS

"SketchUp". Trimble Inc. [online]. Retrieved from the Internet: <URL: www.sketchup.com/>.

Mathieu Nancel et al., "CAUSALITY—A Conceptual Model of Interaction History", Proceedings of the SIGCHI Conference on Human Factors in Computing Systems, 2014, pp. 1777-1786.

* cited by examiner

METHOD FOR CONTROLLING INTERACTION INTERFACE AND DEVICE FOR SUPPORTING THE SAME

CROSS-REFERENCE TO RELATED APPLICATION

This application claims priority to Korean Patent Application No. 10-2019-0100978, filed on Aug. 19, 2019, and all the benefits accruing therefrom under 35 U.S.C. § 119, the contents of which in its entirety are herein incorporated by reference.

BACKGROUND

1. Field

The present disclosure relates to a method for controlling an interaction interface and a device for supporting the same, and more particularly, to a method for providing an interaction undo/redo interface suitable for a three-dimensional virtual environment and a device for supporting the same.

[Description about National Research and Development Support]

This study was supported by the Global Frontier Project of Ministry of Science, ICT, Republic of Korea (Development of Hand-based Seamless CoUI (Coexistence User Interface) for Collaboration between Remote Users, Project No. 1711073470) under the Korea Institute of Science and Technology.

This study was supported by the Global Frontier Project of Ministry of Science, ICT, Republic of Korea (Development of Hand-based Seamless CoUI (Coexistence User Interface) for Collaboration between Remote Users, Project No. 1711082612) under the Korea Institute of Science and Technology.

2. Description of the Related Art

Recently, in line with the rapid development of computer technology and equipment, with the development of various products, users are experiencing a variety of new interactions. Studies for efficient and improved interaction between human and computer have been made, and more recently, a Natural User Interface (NUI) was developed, and the NUI achieves interaction between a user's virtual hand and a three-dimensional (3D) virtual object in virtual space by recognizing the user's gesture, to be specific, the user's hand through a hand tracking device.

Additionally, with regard to interfaces in virtual space, the development of an undo interface and a redo interface leads to the improved convenience of user interaction in virtual space, and the undo interface undoes the user's earlier interaction, and the redo interface sets interaction to a specific time point and redoes the interaction on the basis of the set time point. The activation or control of the undo interface and the redo interface in virtual space may be performed based on the user's gesture. That is, the user's gesture is applied to not only interaction with the 3D virtual object in virtual space but also activation and control of the above-described additional interface, causing confusion when the user's gesture is misrecognized or not recognized. For example, the user intends to interact with the 3D virtual object, but when the user's gesture is misrecognized, the undo interface or the redo interface may be performed, or vice versa. There is a need to clearly distinguish between the user's gesture of manipulating the 3D virtual object and the user's gesture of requesting the additional interface except manipulation interaction.

In this circumstance, the inventor developed a method for providing an interaction undo/redo interface that is more suitable for a 3D virtual environment by clearly distinguishing between a user's gesture of manipulating a 3D virtual object and the user's gesture of requesting an additional interface except manipulation interaction and a device for supporting the same.

SUMMARY

The present disclosure provides a method for controlling an interaction undo/redo interface that is more suitable for a three-dimensional (3D) virtual environment and a device for supporting the same.

An interaction undo support device according to an embodiment of the present disclosure is an interaction undo support device for supporting the undo of interaction performed between a plurality of virtual objects created in a 3D virtual space and a user, wherein the interaction is performed by recognition of the user's gesture, and the interaction undo support device activates an interaction undo interface in response to a gesture not corresponding to the user's interaction gesture.

An interaction redo support device according to another embodiment of the present disclosure is an interaction redo support device for supporting the redo of interaction performed between a plurality of virtual objects created in a 3D virtual space and a user, wherein the interaction is performed by recognition of the user's gesture, and the interaction redo support device activates an interaction redo interface in response to a gesture not corresponding to the user's interaction gesture.

A method for controlling an interaction interface according to still another embodiment of the present disclosure includes causing interaction to be performed between a plurality of virtual objects created in a 3D virtual space and a user, wherein the interaction is performed by recognition of the user's gesture, and activating an interaction undo interface or an interaction redo interface in response to a gesture not corresponding to the user's interaction gesture.

A computer-readable recording medium containing a computer program product, the computer program product is configured to perform the step of: causing interaction to be performed between a plurality of virtual objects created in a three-dimensional (3D) virtual space and a user, wherein the interaction is performed by recognition of the user's gesture; and activating an interaction undo interface or an interaction redo interface in response to a gesture not corresponding to the user's interaction gesture.

A system for providing a virtual space according to further another embodiment of the present disclosure includes a virtual space providing device to provide a 3D virtual space to at least one user, an input device to recognize at least part of the user's body and reflect on the 3D virtual space, an output device to output the 3D virtual space and provide to the user, and an interaction undo support device to support the undo of interaction performed between a plurality of virtual objects created in the 3D virtual space and the user, wherein the interaction is performed by recognition of the user's gesture, and the interaction undo support device activates an interaction undo interface in response to a gesture not corresponding to the user's interaction gesture.

A system for providing a virtual space according to still further another embodiment of the present disclosure includes a virtual space providing device to provide a 3D virtual space to at least one user, an input device to recognize at least part of the user's body and reflect on the 3D virtual space, an output device to output the 3D virtual space and provide to the user, and an interaction redo support device to support the redo of interaction performed between a plurality of virtual objects created in the 3D virtual space and the user, wherein the interaction is performed by recognition of the user's gesture, and the interaction redo support device activates an interaction redo interface in response to a gesture not corresponding to the user's interaction gesture.

The interaction undo support device, the interaction redo support device and the method for controlling an interaction interface according to an embodiment of the present disclosure may provide a user with interaction undo and redo function without confusion with virtual object manipulation through a unique gesture that is different from a gesture of manipulating and controlling the virtual object and an additional interface request device for supplementing it.

DETAILED DESCRIPTION

Figure 1:
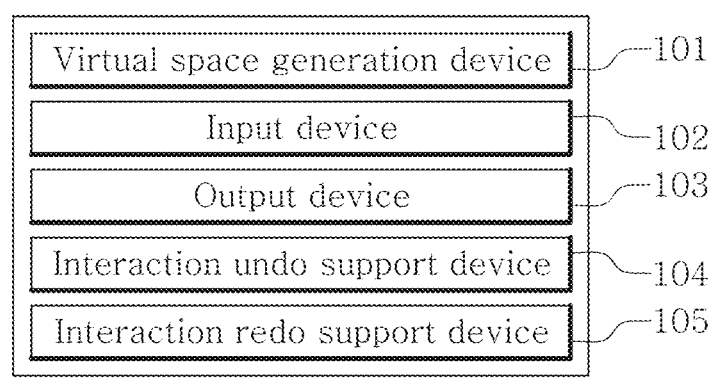
FIG. 1 is a block diagram of a system for providing a virtual space according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not made in limiting senses, and the scope of the present disclosure is only defined by the appended claims along with the full scope of equivalents to which such claims are entitled. In the drawings, similar reference signs denote same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Figure 2:
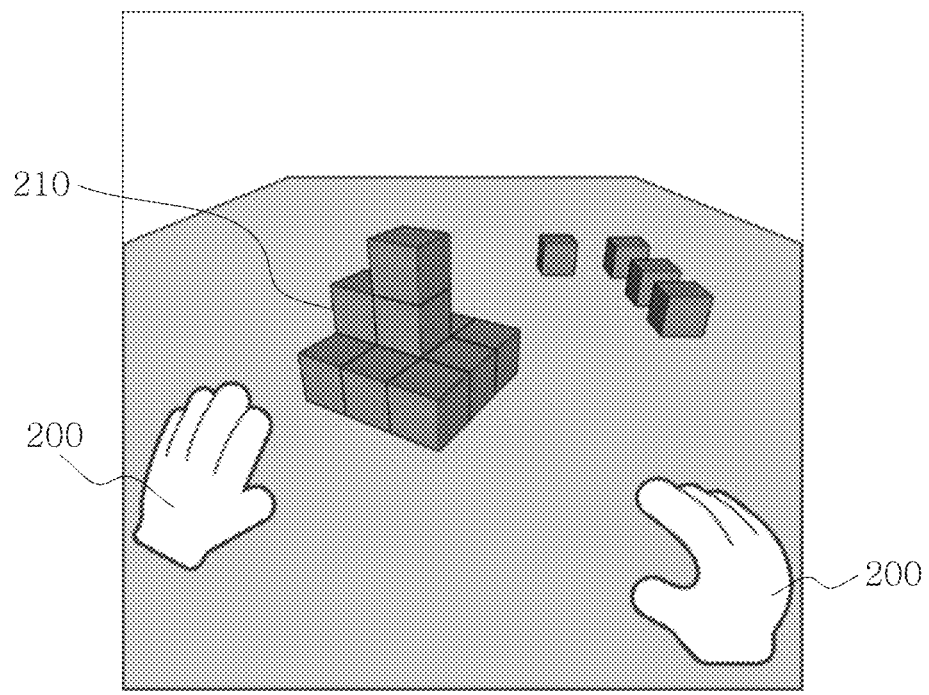
FIG. 2 is an exemplary diagram showing a virtual space according to an embodiment of the present disclosure.

FIG. 1 is a block diagram of a system for providing a virtual space according to an embodiment of the present disclosure. FIG. 2 is an exemplary diagram showing a virtual space according to an embodiment of the present disclosure.

The system 10 for providing a virtual space according to the embodiments and each device or unit of the system 10 for providing a virtual space may have aspects of entirely hardware, or partly hardware and partly software. For example, each element of the system 10 for providing a virtual space according to an embodiment of the present disclosure refers to a combination of hardware and software that is executed by the corresponding hardware. The hardware may be a data processing device including Central Processing Unit (CPU) or other processor. Additionally, the software that is executed by the hardware may refer to a process being executed, an object, an executable, a thread of execution, and a program. For example, an interaction undo support device 104 may refer to a combination of hardware for undoing interaction and software therefor.

Additionally, in the specification, each module of the system 10 for providing virtual space may be connected to communicate with each other in a distributed computing environment, and is not necessarily intended to refer to separate components that are physically different from one another.

The system 10 for providing a virtual space may provide a virtual space in which at least one user participates. The virtual space is where a plurality of virtual objects 210 having a predetermined physical quantity may be created. The virtual object may make physical movements on the virtual space, mimicking the user's body part or the real object. The virtual object may include graphical information and physical information. Here, the graphical information may be information for rendering the virtual object in the virtual space, and the physical information may be information about a physical quantity for applying the law of physics of the virtual object and a contact point for recognizing contact with a virtual object having different physical information. For example, the contact point of the virtual object may be in the form of mesh, and the contact between the virtual objects may be recognized as contact of the mesh points. For example, the virtual object in the virtual space may be a virtual block as shown in FIG. 2, and the virtual space may be a space for a block play using the virtual block, but is not limited thereto, and may be a gaming space in which a chess game may be played.

Referring to FIG. 1, the system 10 for providing a virtual space includes a virtual space generation device 101 to generate the virtual space, an input device 102 to recognize at least part of the user's body and reflect it on the virtual space and an output device 103 to output the virtual space and provide it to the user.

At least part of the user's body (for example, hand) may be recognized through the input device 102 such as a variety of known sensors including a leap motion sensor, an image sensor such as a camera, in particular, a RGBD sensor, and the recognized hand may be provided to the virtual space generation device 101 as input information and may be created as a virtual hand in the virtual space. Additionally, the currently created virtual space may be outputted to the user through the output device 103 such as a three-dimensional (3D) display device or a head mounted display device.

The user may perform interaction in the virtual space. The user participating in the virtual space may perform interaction of manipulating the virtual object in the virtual space through a user interface by making a gesture using at least part of the body. That is, as shown in FIG. 2, the input device 102 may recognize both the user's hands, and the virtual space generation device 101 may create both the user's hands recognized by the input device 102 as virtual hands 200. The user may perform human-object interaction of grasping or moving the virtual object to a specific location using the created virtual hands 200, and the virtual object 210 may change in at least one of the placement location in the virtual space, the placement direction and the relationship with other virtual object according to the human-object interaction.

The user may perform successive 3D manipulation interaction on the plurality of virtual objects created in the 3D virtual space. Here, the successive 3D manipulation interaction refers to a plurality of manipulation interactions performed sequentially in time to change at least one of the plurality of virtual objects. For example, the successive 3D manipulation interaction may refer to an action of successively stacking virtual objects to construct a virtual object of a different shape, i.e., a series of manipulation interactions of stacking virtual blocks to form a bigger structure (a pyramid or a tower) as shown in FIG. 2.

When the user found that a specific interaction with the virtual object was erroneously performed or was not performed as intended during or after the successive 3D manipulation interaction, the user may request interaction undo function. Additionally, when a specific interaction fails all the time during the successive 3D manipulation interaction, the user may set a redo time point and request interaction redo function to redo the specific interaction on the basis of the corresponding time point. Here, the interaction redo function supports the efficient manipulation of the current motion without a series of previous motions by setting and storing the previous situation before the current motion as the redo time point when the current motion is a manipulation that frequently causes errors to the previous motion or affects the previous motion.

The system 10 for providing a virtual space according to this embodiment may include an interaction undo support device 104 to provide interaction undo function, and the interaction undo function may be provided to the user through the interaction undo support device 104.

Additionally, the system 10 for providing a virtual space according to this embodiment may include an interaction redo support device 105 to provide interaction redo function, and the interaction redo function may be provided to the user through the interaction redo support device 105.

The interaction undo support device 104 according to this embodiment is a device for supporting the undo of interaction performed between the plurality of virtual objects created in the 3D virtual space and the user, the interaction performed between the plurality of virtual objects created in the 3D virtual space and the user is performed by recognition of the user's gesture, and the interaction undo support device 104 activates an interaction undo interface through a gesture not corresponding to the user's interaction gesture. Here, the user's interaction gesture refers to the user's gesture or action for interaction performed between the plurality of virtual objects created in the 3D virtual space and the user.

Additionally, the interaction redo support device 105 according to this embodiment is a device for supporting the redo of interaction performed between the plurality of virtual objects created in the 3D virtual space and the user, the interaction between the plurality of virtual objects created in the 3D virtual space and the user is performed by recognition of the user's gesture, and the interaction redo support device 105 activates an interaction redo interface through a gesture not corresponding to the user's interaction gesture. Here, the user's interaction gesture refers to the user's gesture or action for interaction performed between the plurality of virtual objects created in the 3D virtual space and the user.

In an embodiment, the interaction undo support device 104 and/or the interaction redo support device 105 may activate the interaction undo interface and/or the interaction redo interface by the user's wrists touching. The user's wrists touching gesture does not correspond to the general gesture of manipulating the virtual object in the virtual space. That is, the interaction undo support device 104 and/or the interaction redo support device 105 may be activated by the user's motion irrelevant to elaborate movements of the user's hands and may provide the interaction undo interface and/or the interaction redo interface.

For example, the interaction undo support device 104 may be activated in response to the user's wrists touching each other once, and the interaction redo support device 105 may be activated in response to the user's wrists touching each other successively twice. The user's wrists touching may be observed through the input device 102 and provided to the interaction undo support device 104 and/or the interaction redo support device 105, but is not limited thereto. In some embodiments, the user may wear an additional interface request device on both the user's wrists. An additional interface request signal may be generated by a physical touch of the additional interface request device worn on both the user's wrists. The additional interface request device may be configured to transmit and receive data to/from each of the interaction undo support device 104 and the interaction redo support device 105. The additional interface request device may transmit the generated signal to the device corresponding to the generated signal. For example, when the user touches the wrists each other once, an interaction undo activation signal may be generated and provided to the interaction undo support device 104, and when the user touches the wrists each other successively twice, an interaction redo activation signal may be generated and provided to the interaction redo support device 105.

In another embodiment, the interaction undo support device 104 and/or the interaction redo support device 105 may activate the interaction undo interface and/or the interaction redo interface by the user's feet motion. The user's feet manipulation gesture does not correspond to the general gesture of manipulating the virtual object in the virtual space. That is, the interaction undo support device 104 and/or the interaction redo support device 105 may be activated by the user's motion irrelevant to elaborate movements of the user's hands and may provide the interaction undo interface and/or the interaction redo interface.

For example, the interaction undo support device 104 may be activated in response to the user's right foot movement, and the interaction redo support device 105 may be activated in response to the user's left foot movement. The manipulation of both the user's feet may be observed through the input device 102, and provided to the interaction undo support device 104 and/or the interaction redo support device 105, but is not limited thereto. In some embodiments, both the user's feet may be positioned at an additional interface request device for sensing the feet motion. The additional interface request device may sense a change in the feet motion and generate an additional interface request signal. In detail, the additional interface request device may include a right pedal and a left pedal at which the right foot and the left foot are positioned respectively, and the additional interface request signal may be generated by a physical change of the right pedal or the left pedal. The additional interface request device may be configured to transmit and receive data to/from each of the interaction undo support device 104 and the interaction redo support device 105. The additional interface request device may transmit the generated signal to the device corresponding to the generated signal. For example, when there is a change in the right pedal at which the user's right foot is positioned, an interaction undo activation signal may be generated and provided to the interaction undo support device 104, and when there is a change in the left pedal at which the user's left foot is positioned, an interaction redo activation signal may be generated and provided to the interaction redo support device 105.

In still another embodiment, the interaction undo support device 104 and/or the interaction redo support device 105 may activate the interaction undo interface and/or the interaction redo interface by the user's clap. The user's palms touching gesture does not correspond to the general gesture of manipulating the virtual object in the virtual space. That is, the interaction undo support device 104 and/or the interaction redo support device 105 may be activated by the user's motion irrelevant to elaborate movements of the user's hands and may provide the interaction undo interface and/or the interaction redo interface.

For example, the interaction undo support device 104 may be activated in response to the user's palms touching each other once, and the interaction redo support device 105 may be activated in response to the user's palms touching each other successively twice. The user's palms touching may be observed through the input device 102, and provided to the interaction undo support device 104 and/or the interaction redo support device 105, but is not limited thereto. In some embodiments, the user may wear an additional interface request device on both the user's palms. An additional interface request signal may be generated by a physical touch of the additional interface request device worn on both the user's palms. The additional interface request device may be configured to transmit and receive data to/from each of the interaction undo support device 104 and the interaction redo support device 105. The additional interface request device may transmit the generated signal to the device corresponding to the generated signal. For example, when the user touches the palms each other once, an interaction undo activation signal may be generated and provided to the interaction undo support device 104, and when the user touches the palms each other successively twice, an interaction redo activation signal may be generated and provided to the interaction redo support device 105.

Hereinafter, the interaction undo interface and the interaction redo interface described above will be described in more detail with the exemplary display of the embodiments of the present disclosure.

Figure 3:
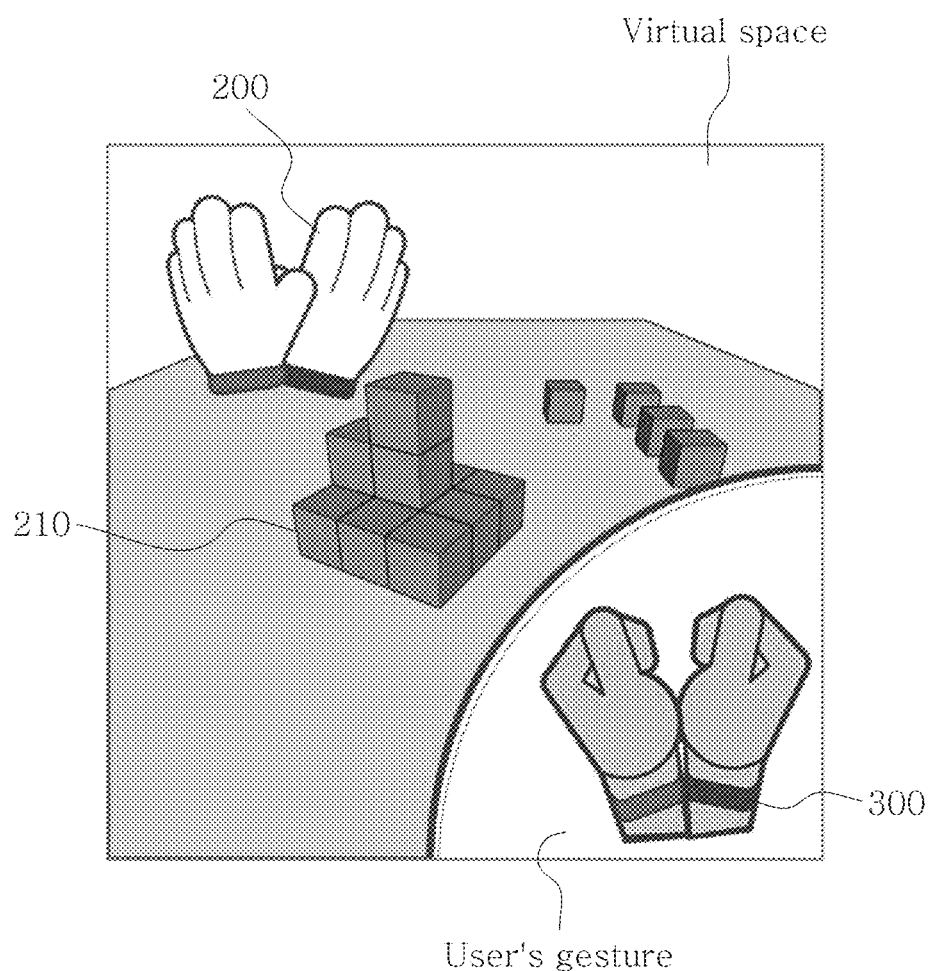
FIGS. 3 to 8 schematically show a process of operation of an interaction undo support device according to an embodiment of the present disclosure.

FIGS. 3 to 8 schematically show a process of operation of the interaction undo support device according to an embodiment of the present disclosure. FIGS. 3 to 8 show the display of the virtual space currently provided to the user and the corresponding gesture of the user together. In detail, as shown in FIG. 3, the user may wear the additional interface request device 300 on the user's wrists. The interaction undo support device 104 may provide the interaction undo interface to the user by the user's wrists touching gesture, i.e., touch of the additional interface request device 300.

The interaction undo interface may provide the user with a search mode for searching earlier interactions in a chronological order, a modification mode for modifying earlier interactions and a record mode for checking a history of modifications made in the modification mode.

The interaction undo support device 104 may collect state information of the virtual space in a predetermined cycle in response to interaction between the user and the virtual object in the virtual space or a change of a specific object. Here, the state information of the virtual space may be data for creating the virtual space, and may at least include graphical information, physical information and location information of all the virtual objects included in the virtual space. The interaction undo support device 104 may provide an interaction undo mode to the user based on the collected state information of the virtual space. In the interaction undo mode, the display of the virtual space reconstructed from the collected information may be provided to the user. Here, the display of the virtual space provided by the undo interface may be generated based on data of the virtual space provided by the virtual space providing device 101 and may be substantially the same as the display of the virtual space provided earlier. However, when the interaction undo interface is performed, part of the display being provided may be modified to inform the user that the interaction undo interface is being currently performed. For example, as shown in FIGS. 4 to 7, a color edge may be displayed around the edge of the display to inform the user that the interaction undo interface is being currently performed.

Figure 4:
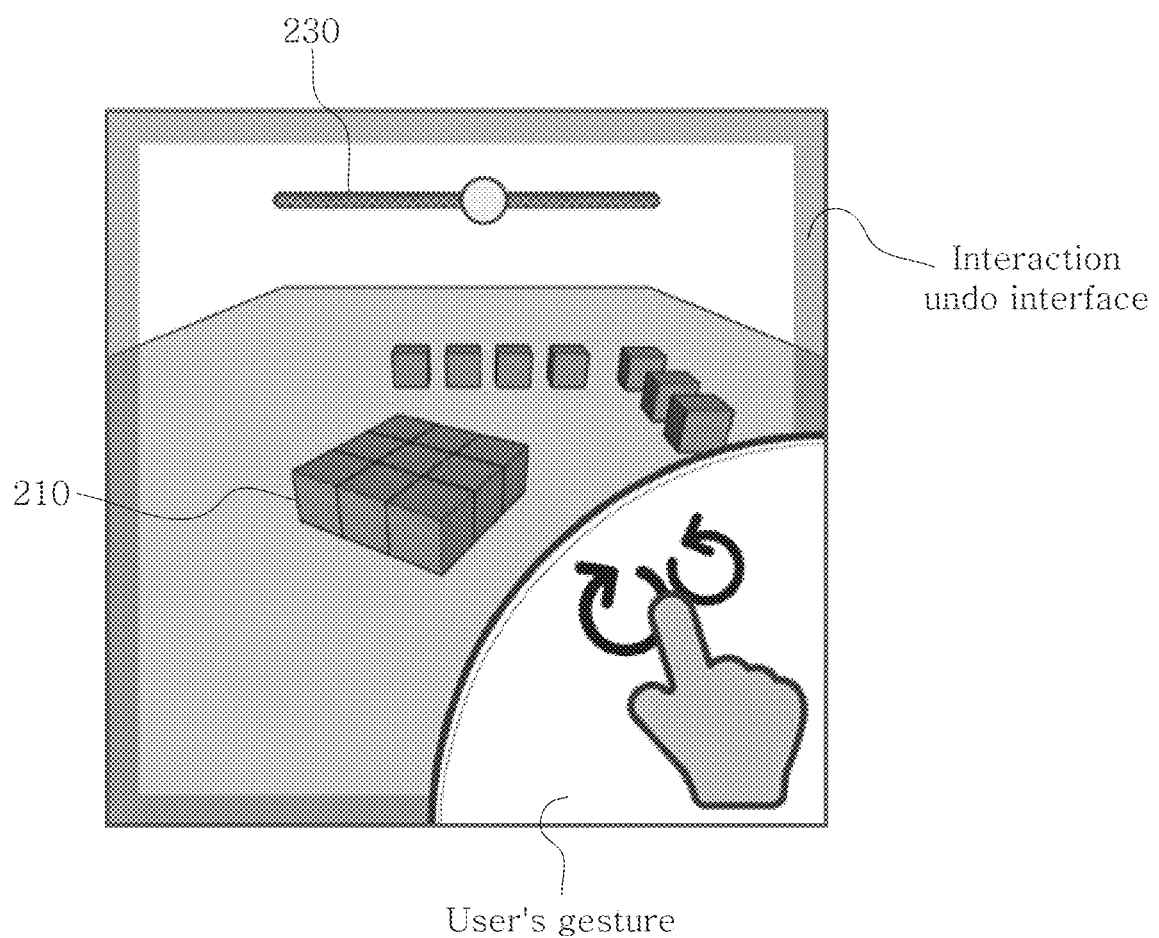

The interaction undo interface may provide an interaction search mode in which the earlier virtual space and its virtual space display are provided based on the stored state information of the virtual space. The display of the virtual space may be arranged in an order of collection time and provided to the user. The interaction undo interface may provide a timeline 230 showing the temporal order of the virtual space display being currently provided. Through the timeline 230, the user may see the temporal order corresponding to the current display of the virtual space in the whole interaction. Additionally, in the interaction search mode, the user may search earlier virtual space displays in a chronological order of the timeline through a gesture. For example, as shown in FIG. 4, the user may make a gesture of rotating the finger in the clockwise or counterclockwise direction, and the current display may be changed to the next display in response to the clockwise rotation.

Figure 5:
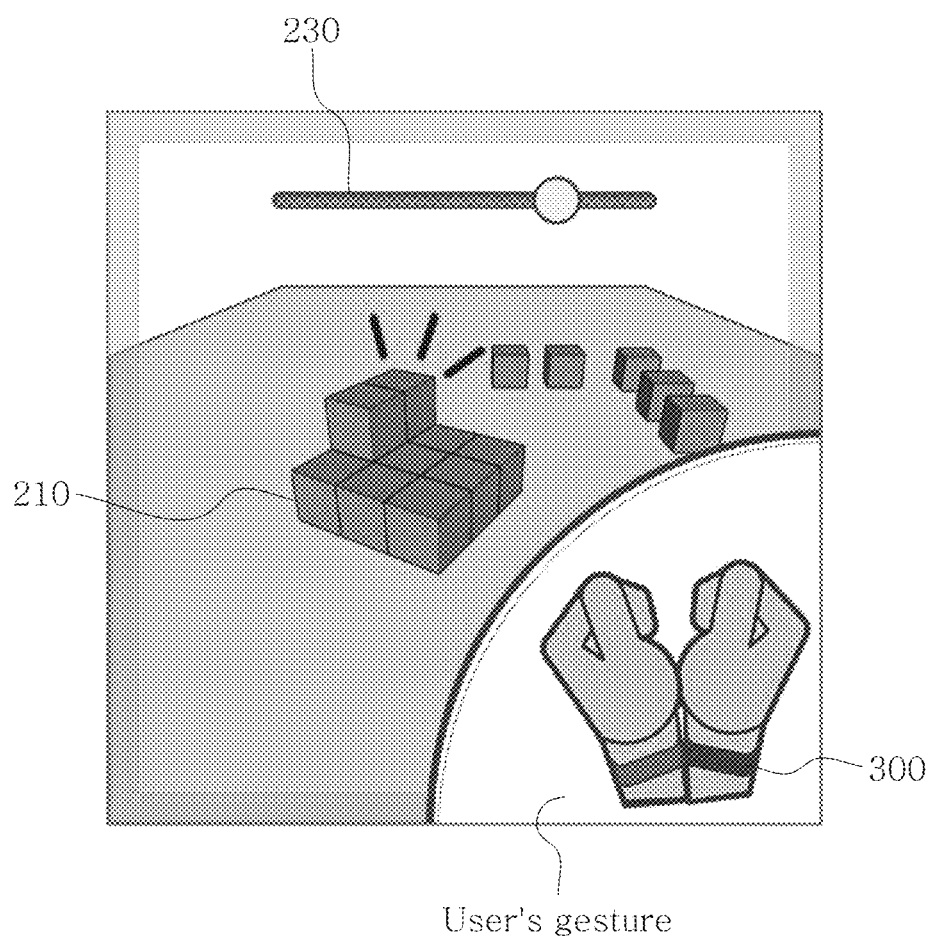
Figure 6:
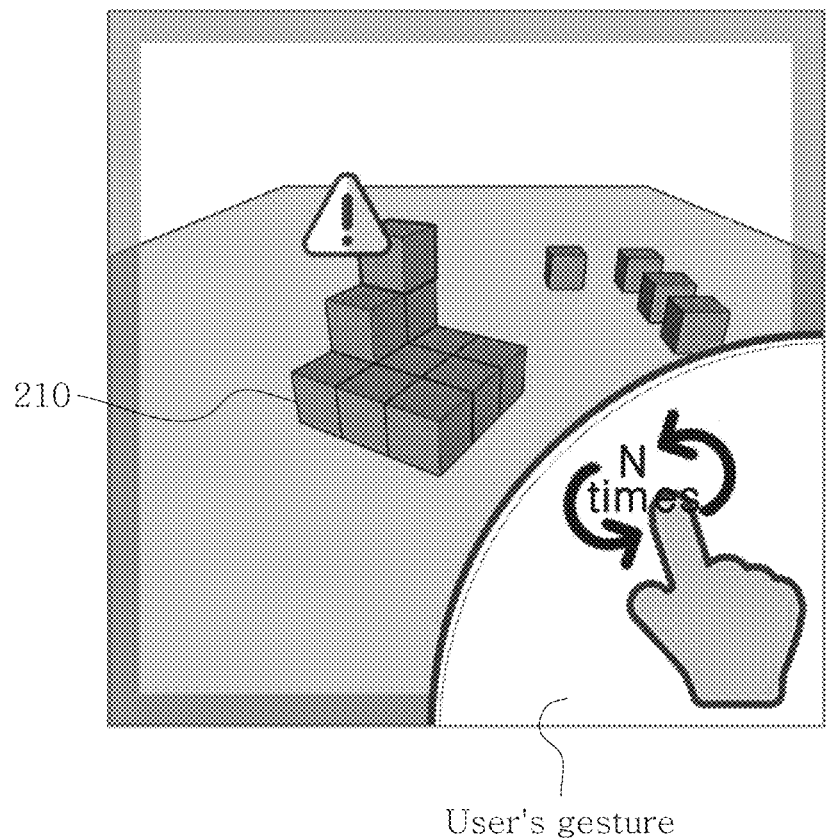

Additionally, the interaction undo interface may provide modification function for earlier manipulation interaction. When the user makes a specific gesture, the user may go from the search mode to the modification mode. For example, when the user stands by on a specific display for a few seconds or longer without taking any other action, the user may go into the modification mode of the corresponding display. In the modification mode of the interaction undo interface, the user may modify at least one of the placement location of the virtual object currently provided on the display, the placement direction and the relationship with the neighboring virtual object. After modification is completed, as shown in FIG. 5, the user may terminate the modification mode through a specific gesture, for example, an action of touching the additional interface request device 300. After the modification mode ends, the interaction undo interface may provide the search mode again. The modification to the virtual object on the virtual space display being currently provided to the user may be equally applied to the virtual space display that comes up next in time, and as a consequence, paradox may occur. That is, due to the change in the location of the virtual block in the second level, a change may occur to the virtual block in the third level within the virtual space. When there is a change in the neighboring object due to the modification to the virtual object, the interaction undo interface according to this embodiment may provide a notification about the state modification of the neighboring object as shown in FIG. 6. After the user sees the notification in the search mode, the user may go into the modification mode of the corresponding display to resolve the change resulting from the modification to the previous display. For example, to cancel the earlier modification, the user may rotate the finger in the counterclockwise direction multiple times, and the interaction undo support device 104 may cancel the modification action that has been done in relation to the current display in response to the finger rotation.

Figure 7:
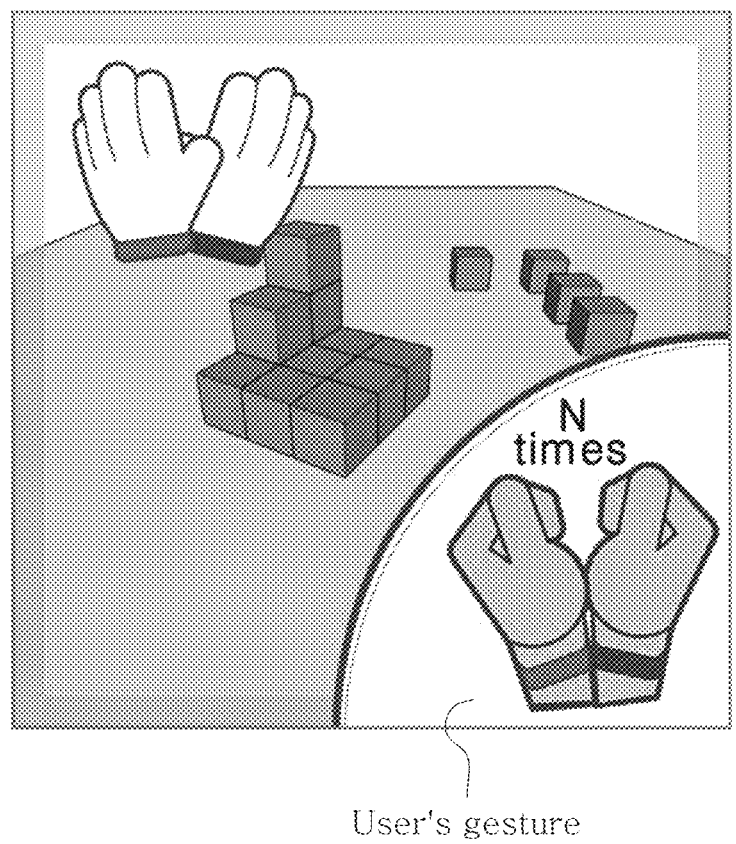
Figure 8:
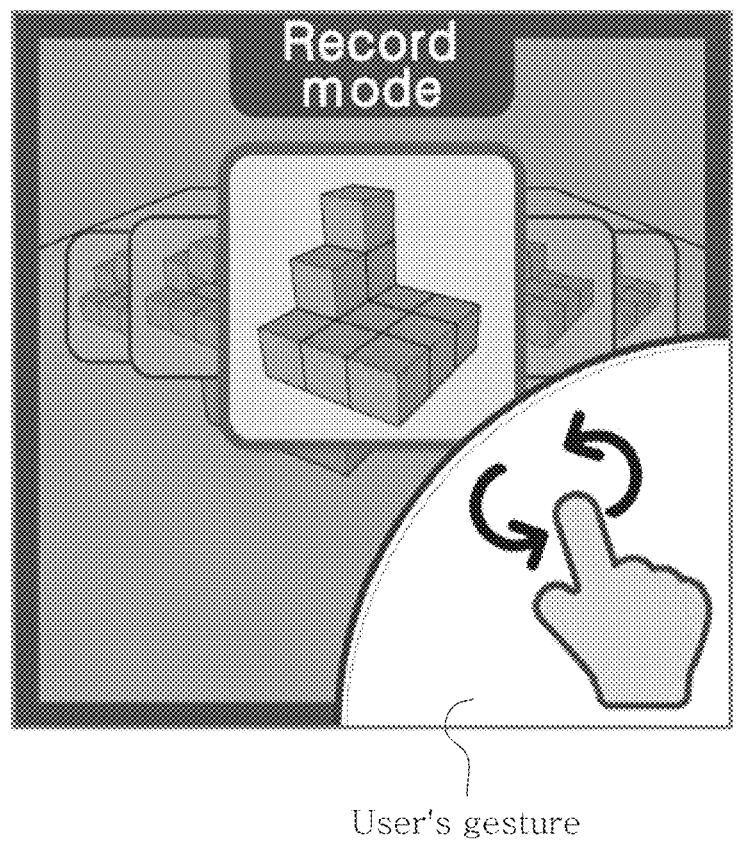

Additionally, in the search mode, the user may call for the record mode to search a history of modifications that have been made in the modification mode. For example, as shown in FIG. 7, the user may call for the record mode through the gesture of touching the additional interface request device 300 multiple times (N times). As shown in FIG. 8, the interaction undo interface according to this embodiment may arrange and provide the history of modifications made in the modification mode in the order of modification time. In the record mode, the user may check the modification history once more and proceed with the cancellation.

As described above, the interaction undo support device 104 according to an embodiment of the present disclosure may be activated to provide the user with interaction undo function without confusion with virtual object manipulation through the wrists touching gesture that is different from the gesture of manipulating and controlling the virtual object and the additional interface request device 300 for supplementing it. Additionally, the interaction redo support device 105 according to this embodiment may be also activated and controlled by manipulation through the additional interface request device 300.

FIGS. 9 to 14 schematically show a process of operation of the interaction redo support device according to another embodiment of the present disclosure.

After the user performs successive 3D manipulation interaction on the virtual object in part, the user may redo the manipulation interaction using the corresponding time point as the redo time point by activating redo function. The activation of redo function by the user may be performed through a separate action and/or device that are different from the gesture of manipulating the virtual object.

Figure 9:
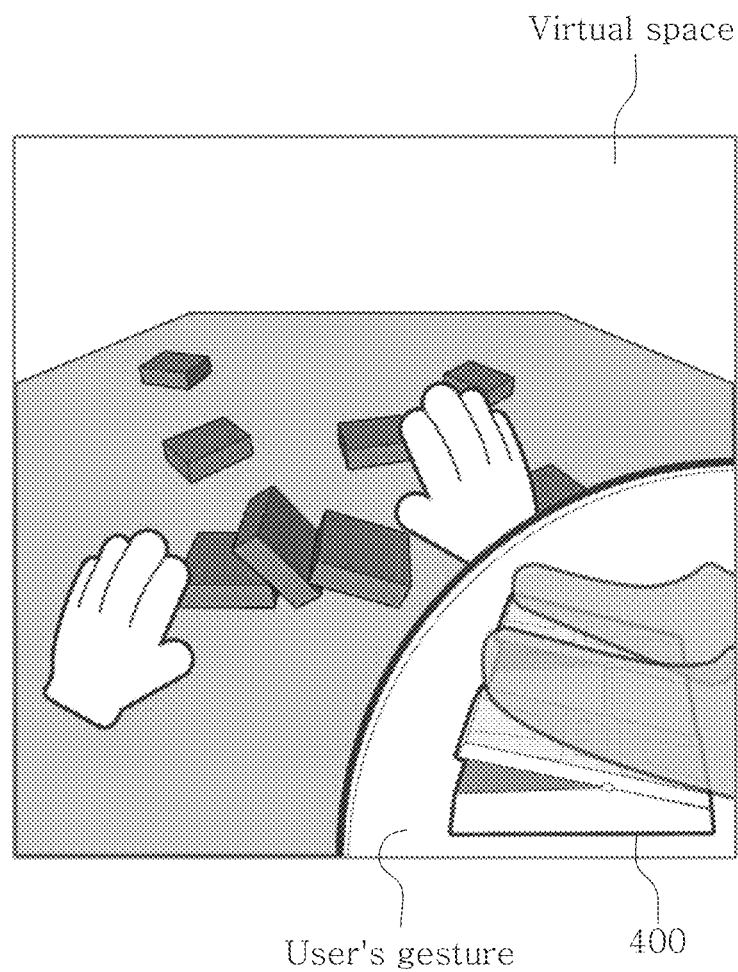
FIGS. 9 to 14 schematically show a process of operation of an interaction redo support device according to another embodiment of the present disclosure.
Figure 10:
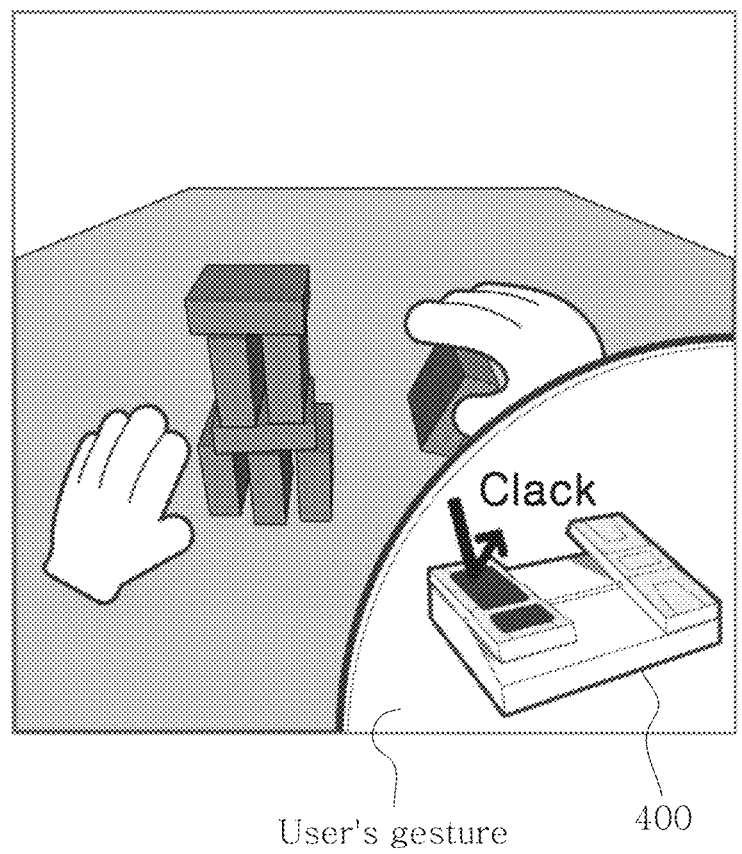

In detail, as shown in FIGS. 9 and 10, when the virtual objects are stacked up to four floors high, the user may only want to take an action of stacking the virtual objects corresponding to the fifth floor. In this instance, if the gesture of activating redo function is recognized as the action of manipulating the virtual object, the currently stacked four floor virtual objects may be affected. However, the interaction redo support device 105 according to this embodiment may be activated without affecting the virtual object manipulation through the additional interface request device 400. Both the user's feet may be positioned at the additional interface request device 400. Here, the additional interface request device 400 may be a pedal input device, and both the user's feet may be positioned at the corresponding pedals. The interaction redo support device 105 may be activated by manipulation of the additional interface request device 400. The interaction redo support device 105 may remember the activation time point as the redo time point and provide redo interaction on the basis of the redo time point. When the interaction redo support device 105 is activated, the user may revert to the virtual space of the redo time point during or after successive 3D manipulation interaction on the plurality of virtual objects, and redo the successive 3D manipulation interaction on the plurality of virtual objects in the virtual space of the redo time point.

As shown in FIG. 10, the user may activate the interaction redo support device 105 by pressing down the left pedal of the additional interface request device 400 to call for the interaction redo interface and remember the redo time point. That is, the current state and in which the virtual blocks are stacked up to four floors high may be remembered, and the current time point may be remembered as the redo time point.

FIGS. 11 to 14 schematically show the display of operation of the interaction redo interface provided by the interaction redo support device 105. The interaction redo support device 105 may provide the same display as the display of the virtual space provided earlier. It is the same with the virtual space and the virtual object included in the virtual space. However, when the interaction redo interface is performed, part of the display being provided may be modified to inform the user that the interaction redo interface is being currently performed. For example, as shown in FIGS. 11 to 14, a color edge may be displayed around the edge of the display to inform the user that the interaction redo interface is being currently performed.

Figure 11:
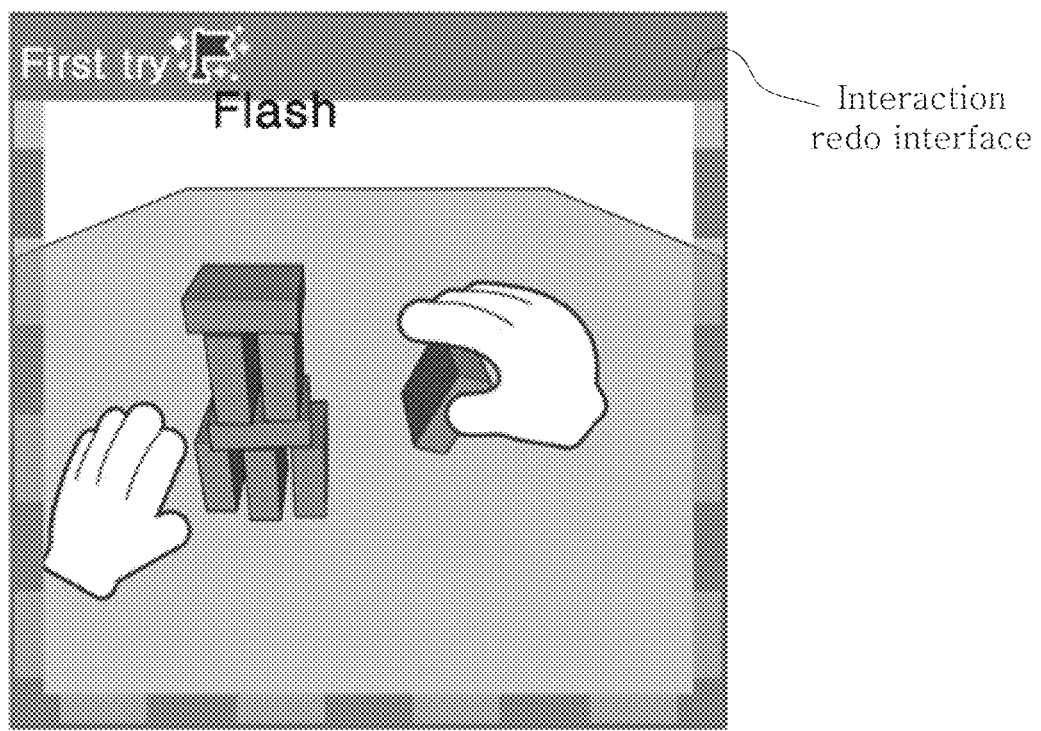
Figure 12:
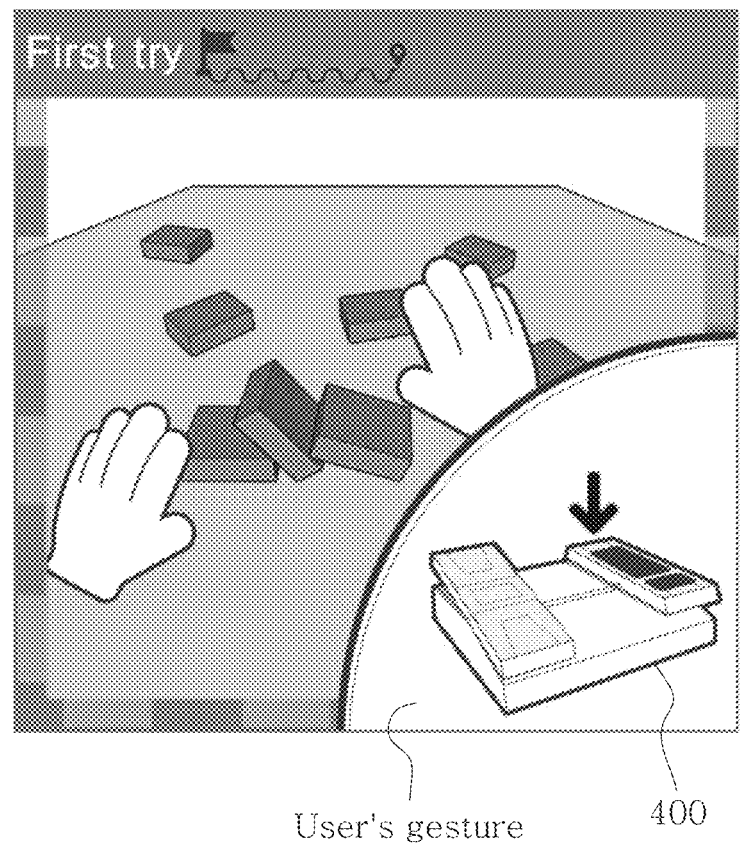

When interaction redo function is activated, the user may successively perform earlier interactions on the virtual object. That is, for example, as shown in FIG. 11, the user may continuously perform interaction of placing one more virtual block on the 4th floor to construct a 5th floor virtual object tower. However, for example, as shown in FIG. 12, the user may fail in stacking the virtual block, and accordingly the whole virtual tower may be destroyed. To revert to the redo time point, the user may transmit a redo signal to the interaction redo support device through an action of pressing down the right pedal of the additional interface request device 400, and in response to the redo signal, the interaction redo support device 105 may provide the user with the virtual space corresponding to the redo time point and the virtual object included in the virtual space.

Figure 13:
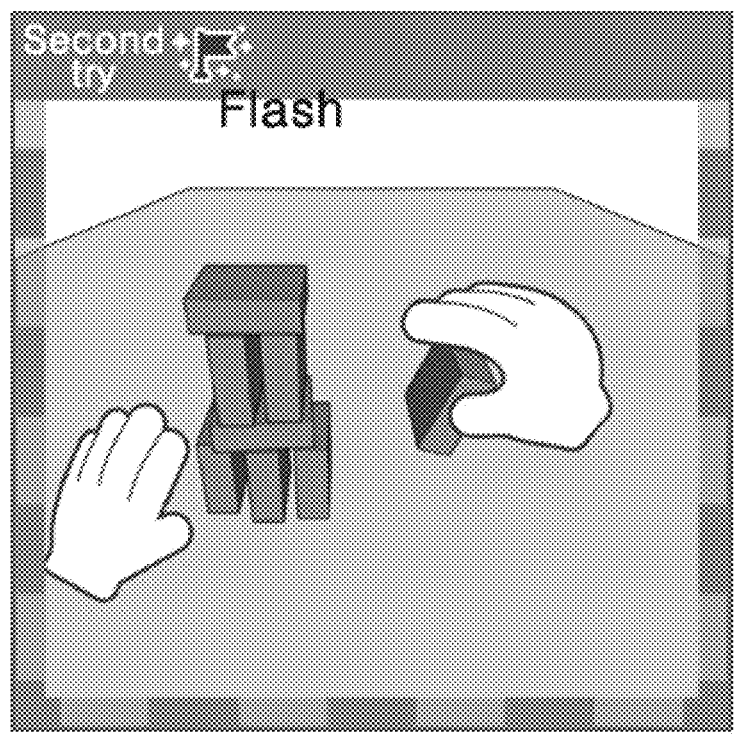
Figure 14:
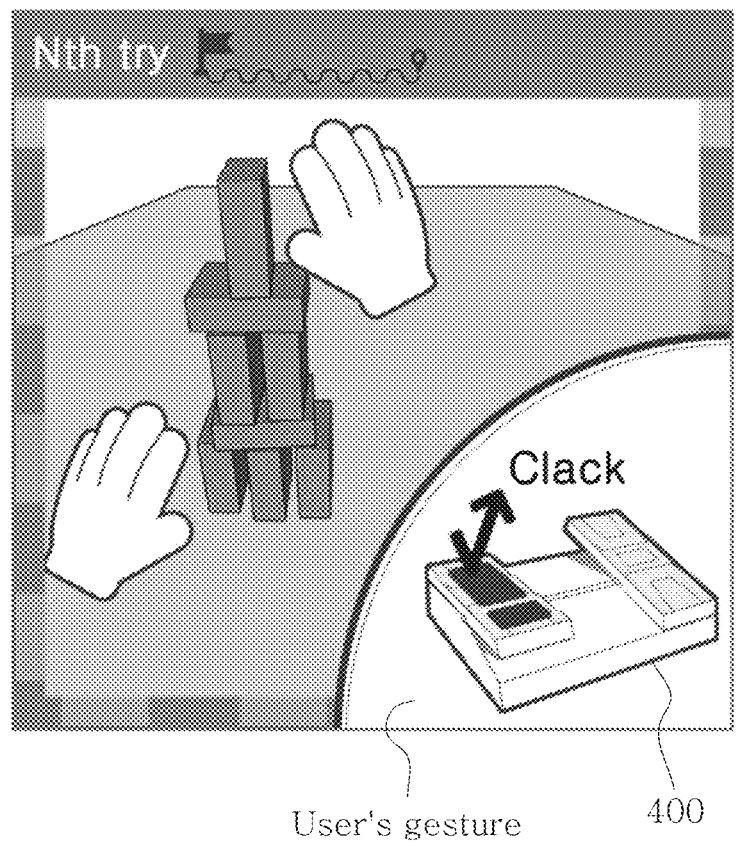

That is, the user may revert to the redo time point and retry the interaction that the user has failed as shown in FIG. 13. The redo of interaction may be continuously performed until the interaction redo interface is deactivated. As shown in FIG. 14, the user may perform interaction of placing one more virtual block to construct a 5th floor virtual object tower, and complete it. The user having succeeded the target interaction through the redo may deactivate the interaction redo support device 105 and terminate the interaction redo interface by pressing down the left pedal of the additional interface request device 400.

As described above, the interaction redo support device 105 according to another embodiment of the present disclosure may be activated to provide the user with interaction redo function without confusion with virtual object manipulation through the unique gesture that is different from the gesture of manipulating and controlling the virtual object and the additional interface request device 400 for supplementing it. Additionally, the interaction undo support device 104 according to this embodiment may be also activated and controlled by manipulation through the additional interface request device 400.

Figure 15:
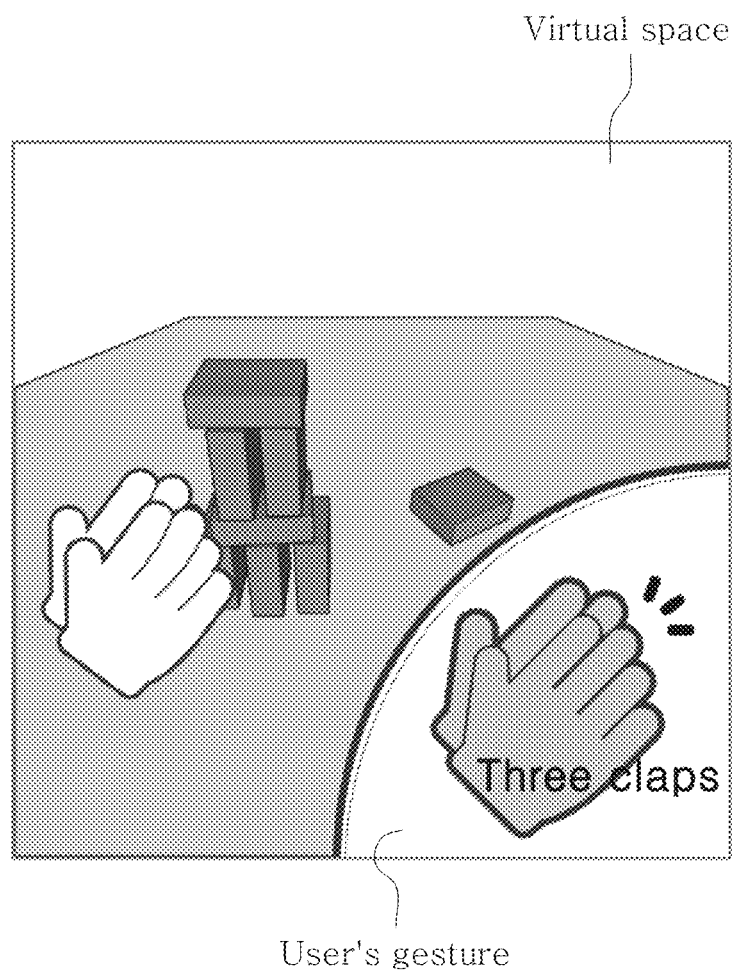
FIGS. 15 to 17 schematically show a process of operation of an interaction redo support device according to still another embodiment of the present disclosure.
Figure 16:
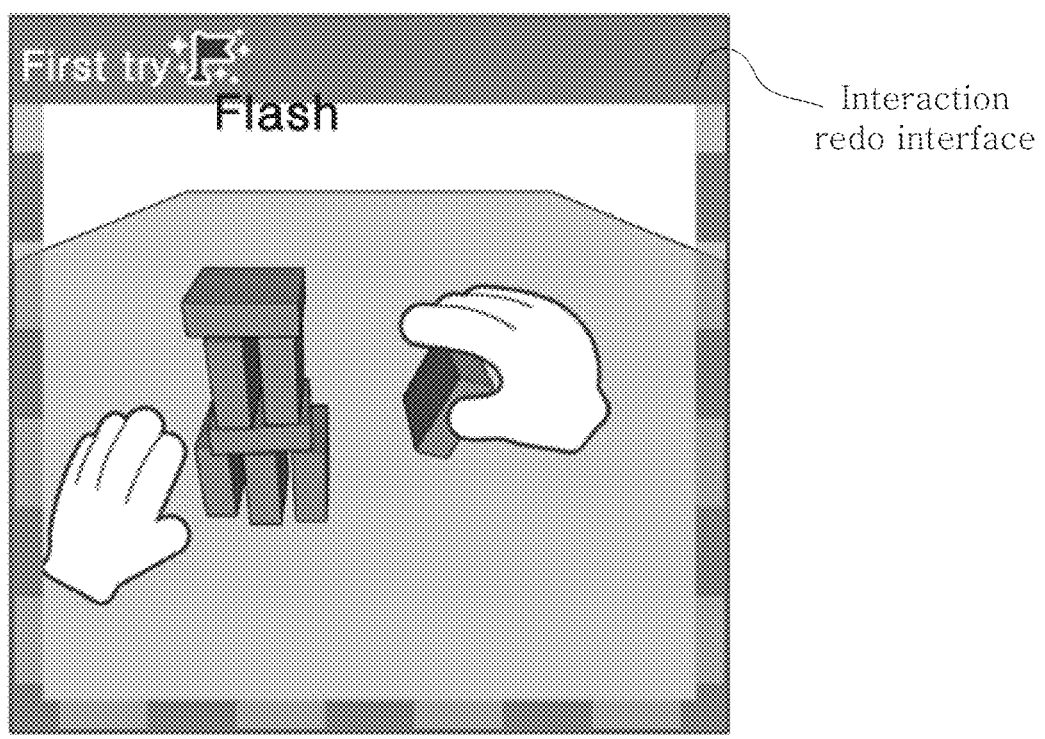
Figure 17:
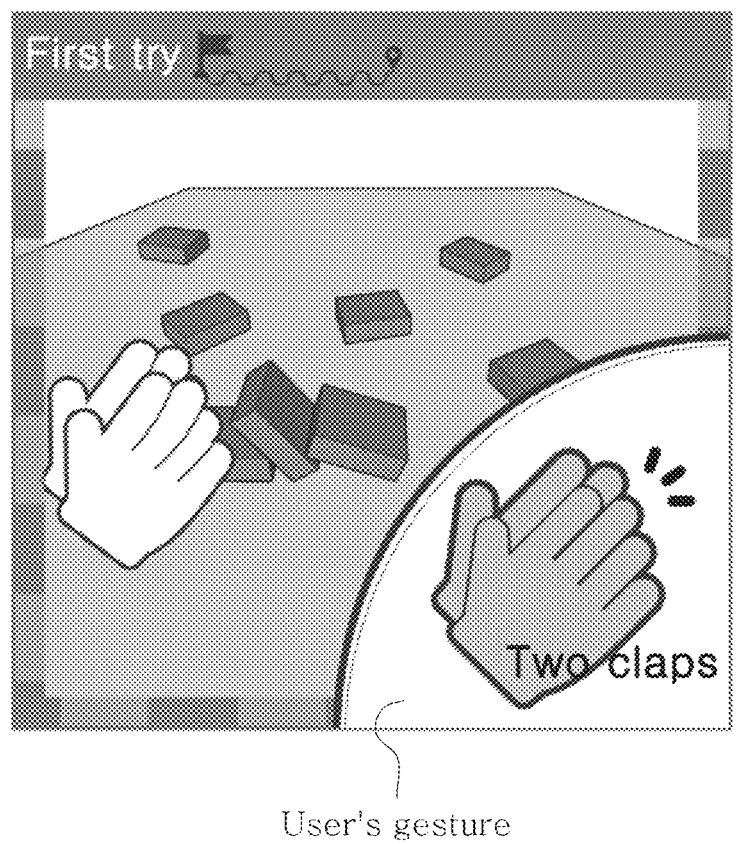

FIGS. 15 to 17 schematically show a process of operation of the interaction redo support device 105 according to still another embodiment of the present disclosure. The interaction redo support device 105 according to still another embodiment of the present disclosure may activate the interaction redo interface by the user's clap. The user's palms touching gesture does not correspond to the general gesture of manipulating the virtual object in the virtual space. That is, the interaction redo support device 105 may be activated by the user's motion irrelevant to elaborate movements of the user's hands and may provide the interaction redo interface. That is, as shown in FIG. 15, the interaction redo support device 105 may recognize the user's three claps and provide the interaction redo interface to the user. As shown in FIG. 16, when the interaction redo interface is activated, the user may continuously perform interaction of placing one more virtual block on the 4th floor to construct a 5th floor virtual object tower. For example, as shown in FIG. 17, the user may fail in stacking the virtual block, and make a gesture for reverting to the redo time point. That is, the user may clap twice, and accordingly, the interaction redo support device 105 may provide the user with the virtual space corresponding to the redo time point and the virtual object included in the virtual space. Additionally, the user having succeeded the target interaction through the redo may deactivate the interaction redo support device 105 and terminate the interaction redo interface by making a gesture of touching the user's palms each other three times.

As described above, the interaction redo support device 105 according to another embodiment of the present disclosure may be activated to provide the user with interaction redo function without confusion with virtual object manipulation through the unique gesture that is different from the gesture of manipulating and controlling the virtual object. Additionally, the interaction undo support device 104 according to this embodiment may be also activated and controlled through the above-described gesture.

Hereinafter, a method for controlling an interaction interface according to yet another embodiment of the present disclosure will be described.

Figure 18:
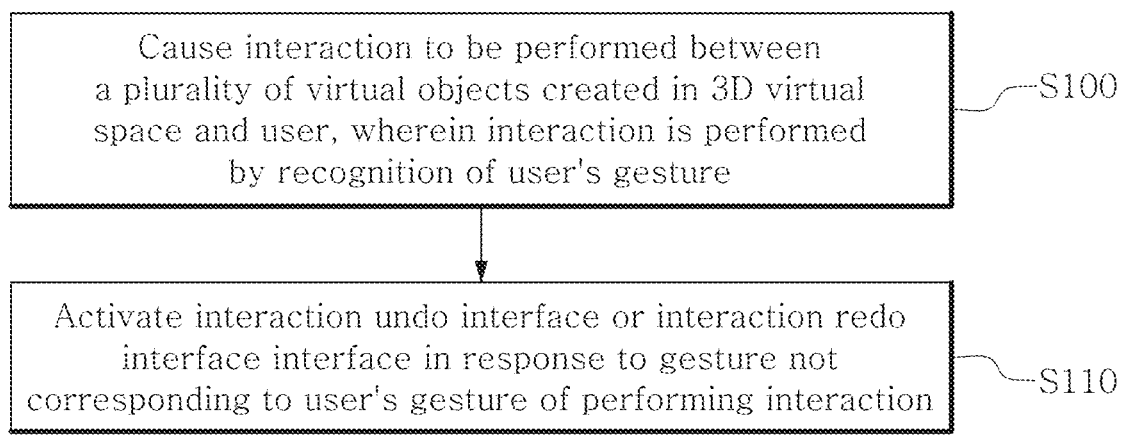
FIG. 18 is a flowchart of a method for controlling an interaction interface according to yet another embodiment of the present disclosure.

FIG. 18 is a flowchart of the method for controlling an interaction interface according to yet another embodiment of the present disclosure. The method according to this embodiment is performed by a virtual space control system including a device for supporting the interaction undo interface and a device for supporting the interaction redo interface according to FIGS. 1 to 17, and its redundant description is omitted herein.

Referring to FIG. 18, the method for controlling an interaction interface according to yet another embodiment of the present disclosure includes the step of causing interaction to be performed between a plurality of virtual objects created in a 3D virtual space and a user, wherein the interaction is performed by recognition of the user's gesture (S100), and the step of activating the interaction undo interface or interaction redo interface in response to a gesture not corresponding to the user's interaction gesture (S110).

The interaction between the plurality of virtual objects created in the 3D virtual space and the user is performed (S100).

At least part of the user's body (for example, hand) may be recognized through the input device 102 such as a variety of known sensors including a leap motion sensor, an image sensor such as a camera, in particular, a RGBD sensor, and the recognized hand may be provided to the virtual space generation device 101 as input information and created as a virtual hand in the virtual space. Additionally, the currently created virtual space may be outputted to the user through the output device 103 such as a 3D display device or a head mounted display device. The user may perform interaction in the virtual space. The user participating in the virtual space may perform interaction of manipulating the virtual object in the virtual space through the user interface by making a gesture using at least part of the body. The input device 102 may recognize both the user's hands, and the virtual space generation device 101 may create both the user's hands recognized by the input device 102 as virtual hands 200. The user may perform human-object interaction of grasping or moving the virtual object to a specific location using the created virtual hands 200, and the virtual object 210 may change in at least one of the placement location in the virtual space, the placement direction and the relationship with other virtual object according to the human-object interaction. The user may perform successive 3D manipulation interaction on the plurality of virtual objects created in the 3D virtual space.

The interaction undo interface or interaction redo interface is activated in response to a gesture not corresponding to the user's interaction gesture (S110).

The interaction undo support device 104 activates the interaction undo interface through the gesture not corresponding to the user's interaction gesture. Additionally, the interaction redo support device 105 activates the interaction redo interface through the gesture not corresponding to the user's interaction gesture.

Here, the interaction undo interface may provide the user with a search mode for searching earlier interactions in a chronological order, a modification mode for modifying earlier interactions and a record mode for checking a history of modifications made in the modification mode, and the interaction redo interface may remember a redo time point, and provide the user with the virtual space corresponding to the redo time point and the virtual object included in the virtual space in response to a redo signal.

In an embodiment, the interaction undo support device 104 and/or the interaction redo support device 105 may activate the interaction undo interface and/or the interaction redo interface by the user's wrists touching. Additionally, the user's gesture of activating the interaction undo interface and the user's gesture of activating the interaction redo interface may be different from each other. For example, the interaction undo support device 104 may be activated in response to the user's wrists touching each other once, and the interaction redo support device 105 may be activated in response to the user's wrists touching each other successively twice.

In another embodiment, the interaction undo support device 104 and/or the interaction redo support device 105 may activate the interaction undo interface and/or the interaction redo interface by the user's feet motion. For example, the interaction undo support device 104 may be activated in response to the user's right foot movement, and the interaction redo support device 105 may be activated in response to the user's left foot movement.

In still another embodiment, the interaction undo support device 104 and/or the interaction redo support device 105 may activate the interaction undo interface and/or the interaction redo interface by the user's clap. For example, the interaction undo support device 104 may be activated in response to the user's palms touching each other once, and the interaction redo support device 105 may be activated in response to the user's palms touching each other successively twice.

In the method for controlling an interaction interface according to this embodiment, the interaction undo interface or interaction redo interface may be activated to provide the user with interaction undo function or interaction redo function without confusion with virtual object manipulation through the unique gesture that is different from the gesture of manipulating and controlling the virtual object.

The operation by the method for controlling an interaction interface according to the embodiments described above may be, at least in part, implemented in a computer program and recorded in a computer-readable recording medium. The computer-readable recording medium, in which the program for performing the operation by the method for controlling an interaction interface according to the embodiments is recorded, includes all types of recording devices in which computer-readable data is stored. Examples of the computer-readable recording medium include ROM, RAM, CD-ROM, magnetic tape, floppy disk, and optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments, the present disclosure should not be interpreted as being limited to these embodiments or the drawings, and those skilled in the art will understand that various changes and modifications may be made to the present disclosure without departing from the spirit and scope of the present disclosure set forth in the appended claims.

What is claimed is:

1. An interaction undo support processor for supporting an undo of interaction performed between a plurality of virtual objects created in a three-dimensional (3D) virtual space and a user, wherein the interaction is performed by recognition of an interaction gesture of the user, and
the interaction undo support processor activates an interaction undo interface in response to a gesture not corresponding to the user's interaction gesture,
wherein
the interaction undo interface provides the user with a search mode for searching earlier interactions in a chronological order, a modification mode for modifying earlier interactions and a record mode for checking a history of modification made in the modification mode, and
the interaction undo interface is configured to change the search mode to the modification mode in response to a specific gesture by the user; and
the interaction undo interface is configured to, in response to a user modification to a first virtual object at a first level in a modification timeline, the user modification causing a paradox due to a change to a virtual object neighboring the first virtual object in a next level in the modification timeline, provide a notification about the change to the neighboring virtual object.

2. The interaction undo support processor according to claim 1, wherein the interaction undo support processor activates the interaction undo interface by the user's wrists touching,
an additional interface request device configured to transmit and receive data to/from the interaction undo support processor is configured to be mounted on both the user's wrists,
an additional interface request signal is generated by a physical touch of the additional interface request device when mounted on both the user's wrists,
the additional interface request device transmits the generated additional interface request signal to the interaction undo support processor, and
the interaction undo support processor activates the interaction undo interface in response to the received additional interface request signal.

3. The interaction undo support processor according to claim 1, wherein the interaction undo support processor activates the interaction undo interface by the user's wrists touching,
the user's wrists touching is sensed by an input device that recognizes the user's gesture, and
the interaction undo support processor activates the interaction undo interface in response to the user's wrists touching being sensed by the input device.

4. The interaction undo support processor according to claim 1, wherein the interaction undo support processor activates the interaction undo interface by a motion of the user's feet,
an additional interface request device is configured to sense the feet motion when both the user's feet are positioned at the additional interface request device, and transmit and receive data to/from the interaction undo support processor,
the additional interface request device senses a change in the feet motion, generates an additional interface request signal, and transmits the generated additional interface request signal to the interaction undo support processor, and
the interaction undo support processor activates the interaction undo interface in response to the received additional interface request signal.

5. The interaction undo support processor according to claim 1, wherein the interaction undo support processor activates the interaction undo interface by the user's palms touching,
the user's palms touching is sensed by an input device that recognizes the user's gesture, and
the interaction undo support processor activates the interaction undo interface in response to the user's palms touching being sensed by the input device.

6. The interaction undo support device according to claim 1, wherein the interaction undo support device is configured to cancel the user modification in response to a rotation of the user's finger.

7. An interaction redo support processor for supporting a redo of interaction performed between a plurality of virtual objects created in a three-dimensional (3D) virtual space and a user, wherein the interaction is performed by recognition of an interaction gesture of the user, and
the interaction redo support processor activates an interaction redo interface in response to a gesture not corresponding to the user's interaction gesture;
wherein the interaction redo interface remembers a redo time point set by the user to store a previous situation, and in response to a redo signal, after one or more user manipulations following the set redo time point that change the previous situation, provides, in a three-dimensional display device, a display corresponding to the previous situation; and wherein the interaction redo support processor activates the interaction redo interface by the user's wrists touching, an additional interface request device is configured to transmit and receive data to/from the interaction redo support processor and is configured to be mounted on both the user's wrists, an additional interface request signal is generated by a physical touch of the additional interface request device when mounted on both the user's wrists, the additional interface request device transmits the generated additional interface request signal to the interaction redo support processor, the interaction redo support processor activates the interaction redo interface and causes the interaction redo interface to be displayed in the three-dimensional display device in response to the received additional interface request signal, the three-dimensional display device being separate from the additional interface request device, and a number of times of occurrence of the physical touch of the additional interface request device when mounted on both the user's wrists distinguishes the generated additional interface request signal to the interaction redo support processor from an additional interface request signal that activates an interaction undo interface.

8. The interaction redo support processor according to claim 7, wherein the interaction redo interface remembers the redo time point, and provides the user with the virtual space corresponding to the redo time point and the virtual object included in the virtual space in response to the redo signal.

9. The interaction redo support device according to claim 7, wherein the interaction redo support device activates the interaction redo interface by the user's wrists touching, the user's wrists touching is sensed by an input device that recognizes the user's gesture, and the interaction redo support device activates the interaction redo interface in response to the user's wrists touching being sensed by the input device.

10. The interaction redo support device according to claim 7, wherein the interaction redo support device is configured to modify a part of the display to provide an indication that the interaction redo interface is being currently performed.

11. The interaction redo support device according to claim 10, wherein the indication includes providing a colored edge to the display.

12. A method for controlling an interaction interface, comprising:

causing interaction to be performed between a plurality of virtual objects created in a three-dimensional (3D) virtual space and a user, wherein the interaction is performed by recognition of an interaction gesture of the user and wherein the 3D virtual space is displayed in a 3D display device; and activating an interaction undo interface or an interaction redo interface in response to the user's wrists touching to bring into contact each of additional interface request devices mounted on the user's wrist and being separate from the 3D display device;

wherein a number of touches of the user's wrists activating an interaction undo interface and a number of touches of the user's wrists activating an interaction redo interface are different from each other.

13. The method for controlling an interaction interface according to claim 12, wherein the interaction redo interface remembers a redo time point, and provides the user with the virtual space corresponding to the redo time point and the virtual object included in the virtual space in response to a redo signal.

14. The method for controlling an interaction interface according to claim 12, wherein the user's gesture of activating the interaction undo interface and the user's gesture of activating the interaction redo interface are different from each other.

15. A method for controlling an interaction interface, comprising:

causing interaction to be performed between a plurality of virtual objects created in a three-dimensional (3D) virtual space and a user, wherein the interaction is performed by recognition of an interaction gesture of a user; and activating an interaction undo interface or an interaction redo interface in response to the user's wrists touching;

wherein a number of touches of the user's wrists activating an interaction undo interface and a number of touches of the user's wrists activating an interaction redo interface are different from each other, and wherein the interaction undo interface is configured to, in response to a user modification to a first object at a first level in a modification timeline, the user modification causing a paradox due to a change to an object neighboring the first object in a next level in the modification timeline, provide a notification about the change to the neighboring object.

* * * * *